United States Patent
Crabtree et al.

[11] Patent Number: 6,070,418
[45] Date of Patent: Jun. 6, 2000

[54] SINGLE PACKAGE CASCADED TURBINE ENVIRONMENTAL CONTROL SYSTEM

[75] Inventors: Ronald E Crabtree, Sun Lakes, Ariz.; Peter C. Collins, Redondo Beach, Calif.; Stanley C. Pollitt, Rancho Palos Verdes, Calif.; Roger R. Sanger, Fountain Valley, Calif.; Michel A. Jonqueres, Torrance, Calif.; Thomas J. Kazan, Irvine, Calif.

[73] Assignee: AlliedSignal Inc., Morristown, N.J.

[21] Appl. No.: 08/996,742

[22] Filed: Dec. 23, 1997

[51] Int. Cl.⁷ ........................................................ F25B 9/10
[52] U.S. Cl. .................................. 62/86; 62/172; 62/401; 62/DIG. 5
[58] Field of Search ................................ 62/87, 172, 402, 62/401, 86, 88, DIG. 5; 454/71, 74, 75

[56] References Cited

U.S. PATENT DOCUMENTS

| | | |
|---|---|---|
| 3,018,634 | 1/1962 | Gilmore .......................................... 62/52 |
| 3,097,508 | 7/1963 | Leech et al. .................................. 62/402 |
| 3,135,318 | 6/1964 | Carleton . |
| 3,355,903 | 12/1967 | LaFleur ........................................... 62/88 |
| 3,696,637 | 10/1972 | Ness et al. .................................. 62/402 |
| 3,735,601 | 5/1973 | Stannard, Jr. .................................. 62/87 |
| 3,877,246 | 4/1975 | Schutze . |
| 3,878,692 | 4/1975 | Steves ........................................... 62/87 |
| 4,196,773 | 4/1980 | Trumpler ................................. 62/402 X |
| 4,522,636 | 6/1985 | Markbreiter et al. ......................... 55/23 |
| 4,550,573 | 11/1985 | Rannenberg ............................... 62/172 |
| 4,840,036 | 6/1989 | Sparker, Jr. ............................ 62/402 X |
| 5,014,518 | 5/1991 | Thomson et al. ............................ 62/88 |
| 5,056,335 | 10/1991 | Renniger et al. ........................ 62/87 X |
| 5,086,622 | 2/1992 | Warner ........................................ 62/88 |
| 5,157,926 | 10/1992 | Guilleminot ................................. 62/24 |
| 5,317,904 | 6/1994 | Bronicki ....................................... 62/87 |
| 5,461,882 | 10/1995 | Zywiak ...................................... 62/401 |
| 5,704,218 | 1/1998 | Christians et al. ......................... 62/172 |

FOREIGN PATENT DOCUMENTS

WO 97/37890  10/1997  WIPO .

*Primary Examiner*—Harry B. Tanner
*Attorney, Agent, or Firm*—William J. Zak, Jr., Esq.

[57] ABSTRACT

An environmental control system includes a single heat exchanger, a single water separator and two air cycle machines on separate spools. Cooling turbines of the air cycle machines are cascaded. Air flows through both air cycle machines during normal operation of the environmental control system. If one of the air cycle machines fails, air can be bypassed around the failed air cycle machine. Cascading allows water separation to be performed by a mid-pressure water separator located between the air cycle machines.

31 Claims, 2 Drawing Sheets

SINGLE PACKAGE CASCADED TURBINE ENVIRONMENTAL CONTROL SYSTEM

BACKGROUND OF THE INVENTION

The invention relates to environmental control systems. More specifically, the invention relates to an environmental control system including redundant air cycle machines.

An environmental control system for an aircraft is designed to control airflow into the aircraft's passenger cabin as well as air temperature inside the passenger cabin. Most aircraft air environmental control systems operate on an air cycle refrigeration principle. Compressed air is obtained from a compressor stage of the aircraft's main engine, cooled with ambient air to near-ambient temperature in an air-to-air heat exchanger and then expanded in an air cycle machine to provide a stream of cooled, conditioned air. The conditioned air is supplied to the passenger cabin. Although somewhat expanded, the conditioned air also pressurizes the cabin.

There will be occasions when the air cycle machine fails. When failure occurs in corporate aircraft, hot bleed air from an air-to-air heat exchanger upstream the air cycle machine is typically provided to the cabin. The cabin remains pressurized, but the hot bleed air makes it extremely uncomfortable for those passengers inside the cabin. Instead of dumping the bleed air into the cabin, manufacturers of larger commercial aircraft have opted for redundant air cycle machines in separate packages. If one package fails, the redundant package provides backup and keeps the passengers comfortable.

However, redundancy comes at a cost. Adding a second air-to-air heat exchanger, a second water extractor, a second condenser, a second reheater and a second air cycle machine all increase the parts count and weight of the aircraft. Increasing the parts count results in a decrease in reliability. Increasing the weight results in an increase in fuel consumption and, therefore, the cost of operating the aircraft.

SUMMARY OF THE INVENTION

The cost of redundancy is reduced by the present invention, which may be regarded as an environmental control system. The environmental control system includes redundant first and second air cycle machines on separate spools. The first air cycle machine includes a first cooling turbine; and the second air cycle machine includes, a second cooling turbine. The second cooling turbine is cascaded with the first cooling turbine. Additionally, the second cooling turbine is downstream the first cooling turbine. The environmental control system further includes means for selectively bypassing air around the first and second air cycle machines. Air can be bypassed around the first air cycle machine when the first air cycle machine fails, and air can be bypassed around the second air cycle machine when the second air cycle machine fails.

DETAILED DESCRIPTION OF THE INVENTION

Figure 1:
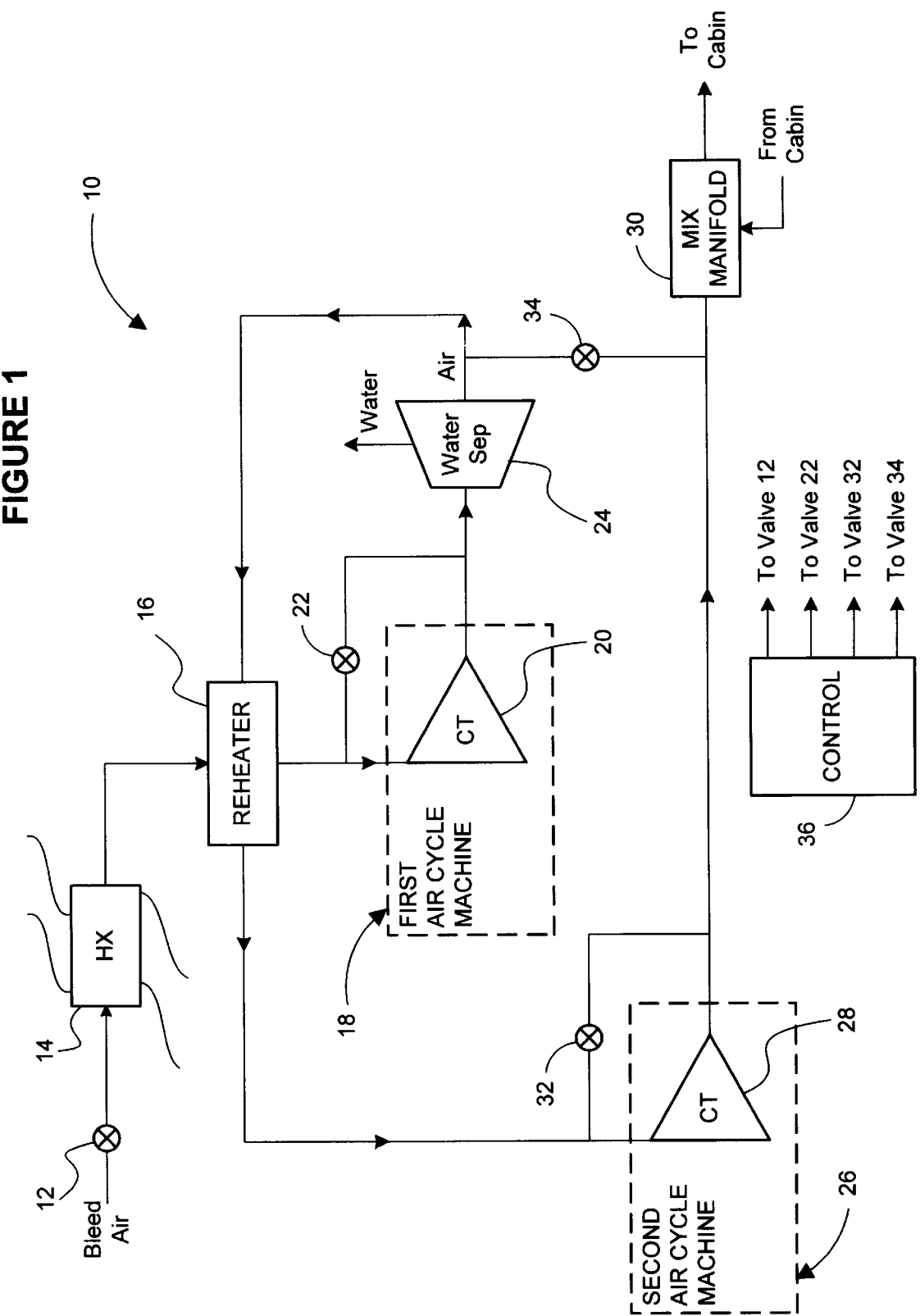
FIG. 1 is an illustration of a first embodiment of an environmental control system according to the present invention.

FIG. 1 shows an environmental control system (ECS) 10 for the cabin of an aircraft. The ECS 10 is located typically in the belly or tail cone of the aircraft. Bleed air from a compressor stage of an aircraft engine, an auxiliary power unit or a ground cart (not shown) is supplied via a first flow control valve 12 to a hot side of an air-to-air heat exchanger 14. In the air-to-air heat exchanger 14, heat of compression is removed from the bleed air and dumped to ambient. A pressurized stream of air leaving the hot side of the air-to-air heat exchanger 14 is supplied to a hot side of a reheater 16, where additional heat is removed.

Air leaving the hot side of the reheater 16 is supplied to a first air cycle machine 18, which includes a first cooling turbine 20. The air leaving the hot side of the reheater 16 is expanded in the first cooling turbine 20 and thereby cooled. The expansion also causes water entrained in the air to form droplets.

Upstream of the first air cycle machine 18, however, the air leaving the hot side of the reheater 16 flows through a first temperature control valve 22. The first temperature control valve 22 allows a portion of the air leaving the hot side of the reheater 16 to bypass the first cooling turbine 20. The air bypassing the first cooling turbine 20 can be used to raise the temperature of the air leaving the first cooling turbine 20.

The air leaving the first cooling turbine 20 is supplied to a mid-pressure water separator 24. The water separator 24 can include a support cone covered by a bag or cloth or vanes for centrifugal separation. The cooled air flows through the support cone and passes through the cloth, but the water droplets entrained in the air are stopped by the cloth. The water stopped by the cloth can then be removed and sprayed on the cold side of the air-to-air heat exchanger 14. Thus, the water separator 24 performs water separation without using a condenser.

Before dehumidified air leaving the water separator 24 is supplied to a second air cycle machine 26 for expansion in a second cooling turbine 28, the dehumidified air is supplied to a cold side of the reheater 16 and reheated. Reheating puts more energy into the dehumidified air, which allows for greater cooling in the second cooling turbine 28. Additionally, reheating increases turbine reliability by minimizing the formation of ice on the wheel of the second cooling turbine 28.

The air leaving the cold side of the reheater 16 is expanded in the second cooling turbine 28 and thereby cooled to subfreezing temperatures. The second cooling turbine 28 is shown as being on a separate spool from the first cooling turbine 20. Air leaving the second cooling turbine 28 is supplied to a mix manifold 30. The mix manifold 30 mixes the subfreezing air leaving the second cooling turbine 28 with air from the aircraft cabin. Air leaving the mix manifold 30 is supplied to the aircraft cabin.

A second temperature control valve 32 allows a portion of the air leaving the cold side of the reheater 16 to bypass the second cooling turbine 28. The air bypassing the second cooling turbine 28 can be used to raise the temperature of the air leaving the second cooling turbine 28.

The ECS 10 also includes a reheater bypass valve 34. When opened, the reheater bypass valve 34 allows dehumidified air to flow directly from the water separator 24 to the mix manifold 30.

The first flow control valve 12, the reheater bypass valve 34 and the first and second temperature control valves 22 and 32 are all controlled by a controller 36. The controller 36 receives signals from sensors (not shown) indicating speeds of the first and second air cycle machines 18 and 26. The sensor signals indicate whether the air cycle machines 18 and 26 are functioning properly. If both air cycle machines 18 and 26 are functioning properly, the controller 36 closes the reheater bypass valve 34 and maintains the first and second temperature control valves 22 and 32 at their respective set points.

If the second air cycle machine 26 is not functioning properly, the controller 36 opens the reheater bypass valve 34. Cooled air is supplied to the water separator 24 by the first air cycle machine 18, and dehumidified air is supplied directly from the water separator 24 to the mix manifold 30.

If the first air cycle machine 18 is not functioning properly, the controller 36 opens the first temperature control valve 22. Air flows from the hot side of the reheater 16 directly to the water separator 24, where little if any water is extracted. Air leaving the water extractor 24 flows through the cold side of the reheater 16, but no reheating occurs. Air leaving the cold side of the reheater 16 is expanded in the second cooling turbine 28. Cooled air leaving the second cooling turbine 28 is supplied to the aircraft cabin. Thus, if the first air cycle machine 18 fails, the second air cycle machine 26 will still provide cooled, albeit somewhat moist air to the aircraft cabin. Some of the water in the air could be removed by placing drain holes in the mix manifold 30.

The controller 36 also establishes the set points for the first and second temperature control valves 22 and 32. The set point for the first temperature control valve 22 determines the temperature of the air entering the water separator 24 (when both air cycle machines 18 and 26 are functioning properly). However, care should be taken in determining the set point for the first temperature control valve 22. Since the air bypassing the first cooling turbine 18 adds uncondensed water to the cooled air, much of the uncondensed water will not be removed by the mid-pressure water separator 24. Consequently, if too much bypass air is added to the cooled air leaving the first cooling turbine 18, the air leaving the water separator 24 might be too warm and too moist.

It is possible that the air-to-air heat exchanger 14 or the reheater 16 might fail during flight. However, the likelihood is extremely remote. The likelihood that the air-to-air heat exchanger 14 or the reheater 16 would fail completely during a flight at a high altitude is even more remote.

It is also possible that the first flow control valve 12 might fail during flight. To ensure that bleed air flows to the air-to-air heat exchanger, a second flow control valve (not shown) could be placed in parallel with the first flow control valve 12. The second flow control valve would provide redundancy. Instead of using redundant flow control valves, however, the first flow control valve 12 could be a spring-loaded, normally open valve, and a pressure relief valve could be located midstream the spring-loaded valve and the air-to-air heat exchanger 14. The controller 36 would close the spring-loaded valve to stop the flow of bleed air to the air-to-air heat exchanger 14. If the controller 36 fails, the spring-loaded valve would still be open to allow bleed air to flow to the air-to-air heat exchanger 14.

The ECS 10 can be operated as follows, with temperatures and pressures being provided merely for exemplary purposes. Bleed air is supplied to the ECS 10 and cooled, first by the air-to-air heat exchanger 14, then by the reheater 16. The air-to-air heat exchanger 14 can drop the temperature of the bleed air by 95° C. to 150° C. The reheater 16 cools the air by another 10° C. The cooled bleed air is expanded in the first cooling turbine 20 when the first air cycle machine 18 is functioning properly. Air enters the first cooling turbine 20 at a pressure of approximately 350 kPa and leaves the first cooling turbine 20 at a pressure of approximately 200 kPa and a temperature between 2° C. and 10° C. When the first temperature control valve 22 has a set point at about 5° C., the first temperature control valve 22 will allow a small amount of air to bypass the first cooling turbine if the air leaving the first cooling turbine 20 is below 5° C. Mid-pressure water separation is performed on the air leaving the first cooling turbine 20, and the dehumidified air is reheated by the reheater 16, thereby raising the temperature of the dehumidified air by about 15° C. The reheated air enters the second cooling turbine 28 at a pressure of approximately 180 kPa when the second air machine 26 is functioning properly, and subfreezing air leaves the second cooling turbine 28 at a pressure of approximately 110 kPa. The subfreezing air is supplied to the mix manifold 30. When not functioning properly, the second air cycle machine 26 is bypassed such that dehumidified air is supplied to the aircraft cabin directly from the water separator 24. When not functioning properly, the first air cycle 18 machine is bypassed such that air leaving the hot side of the reheater 16 is supplied directly to the water separator 24.

Thus disclosed is a single package ECS 10 that provides redundancy with first and second air cycle machines 18 and 26 but only with a single heat air-to-air exchanger 14, a single reheater 16, and a single water separator 24. Eliminating a second air-to-air heat exchanger, a second reheater and a second water separator reduces the parts count, which increases reliability. Eliminating the second air-to-air heat exchanger, the second reheater and the second water separator also reduces size and weight of the ECS 10. Fuel is saved, and the cost of operating the aircraft is lowered.

Cascading the first and second cooling turbines 20 and 28 results in a more efficient thermodynamic cycle and allows the air to be cooled to subfreezing temperatures. Thus, less air is used to cool the aircraft cabin. Consequently, the size of the air-to-air heat exchanger 14 can be reduced. Performing mid-pressure water separation instead of high pressure separation eliminates the need for a condenser.

The ECS 10 is especially useful for regional and corporate aircraft. However, the ECS 10 is also useful for commercial and military aircraft.

Figure 2:
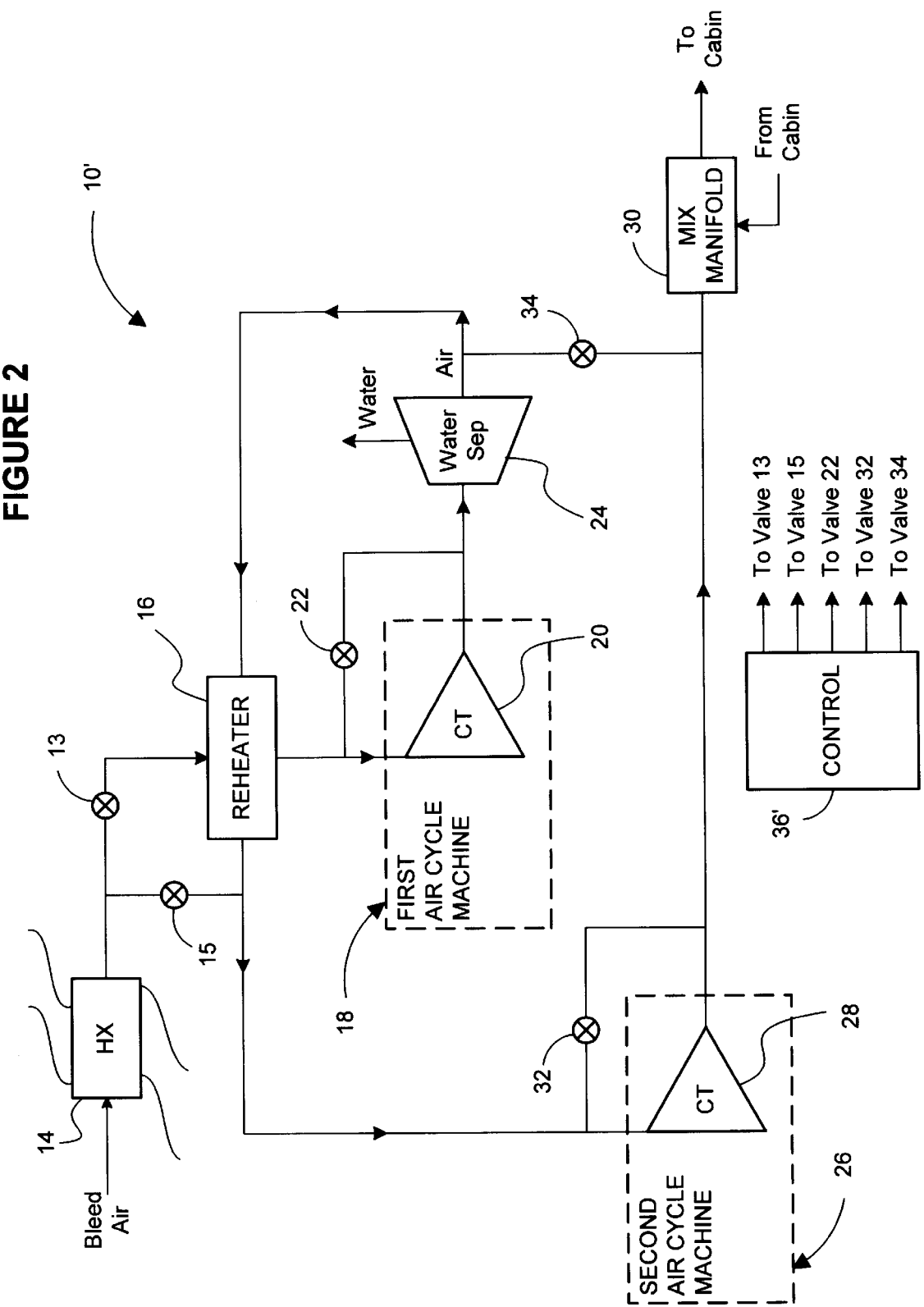
FIG. 2 is an illustration of a second embodiment of an environmental control system according to the present invention.

FIG. 2 shows an ECS 10' that is especially useful for a large commercial aircraft. The first flow control valve 12 is replaced by spring-loaded, normally-closed second and third flow control valves 13 and 15, which are controlled by the controller 36. The second and third flow control valves 13 and 15 allow the first and second air cycle machines 18 and 26 to be operated in parallel. The first and second air cycle machines 18 and 26 are cascaded by opening the second flow control valve 13 and closing the third flow control valve 15. The first and second air cycle machines 18 and 26 are operated in parallel by opening the second and third flow control valves 13 and 15 and also by opening the reheater bypass valve 34. Opening the reheater bypass valve 34 reduces the amount of air flowing through the reheater 16. Consequently, a first portion of the bleed air leaving the air-to-air heat exchanger 14 is expanded in the first cooling turbine 20; and a second portion of the bleed air leaving the air-to-air heat exchanger 14 is expanded in the second cooling turbine 28. The water separator 24 performs air/water separation on air leaving the first cooling turbine 20, and the mixing manifold 30 mixes air leaving the water separator 24 with air leaving the second cooling turbine 28. Parallel operation provides greater air flow than cascaded operation, but cascaded operation provides more efficient cooling.

For a large commercial aircraft, cooling might be more important during ground operation, and ventilation might be more important during flight. Therefore, the air cycle machines 18 and 26 would be cascaded during ground operation and operated in parallel during flight.

The third flow control valve 15 also provides redundancy for the second flow control valve 13. In the event the second flow control valve 13 fails to close, the controller 36 opens the third flow control valve 15 and allows air to flow directly to the second cooling turbine 28.

The ECS 10' allows a commercial airliner to use a single package instead of two packages, and it will allow the newer, large airliners to use two packages instead of four packages. Moreover, by offering parallel and cascaded operation, the ECS 10' allows for more efficient operation on the ground and in the air.

The invention is not limited to the specific embodiment described above. For example, a water extractor could be used instead of the water separator 24. Pressure regulators could be used instead of the flow control valves 12, 13, and 15.

Although the first and second air cycle machines 18 and 26 are shown only with their cooling turbines 20 and 28, it is understood that the first and second air cycle machines 18 and 26 include additional rotating components. However, the types of additional rotating components are dependent upon the application for which the ECS 10 or 10' is intended. For example, the first air cycle machine 18 could be a simple cycle machine having a first fan and a first cooling turbine 20 mounted to a first common shaft; and the second air cycle machine 26 could be a simple cycle machine having a second fan and a second cooling turbine 28 mounted to a second common shaft. The first fan could be optimally sized for the first cooling turbine 20, and the second fan could be optimally sized for the second cooling turbine 28.

In the alternative, one of the air cycle machines could be a simple cycle machine having a fan and a cooling turbine mounted to a shaft; and the other air cycle machine could be a two wheel bootstrap machine having a compressor and a cooling turbine mounted to another shaft. The fan could be optimally sized for its co-mounted cooling turbine, and the compressor could be optimally sized for its co-mounted cooling turbine. However, the use of the compressor would typically result in the addition of a secondary air-to-air heat exchanger to provide to provide additional cooling upstream of the reheater 16.

In the alternative, one of the air cycle machines could be a simple cycle machine, and the other air cycle machine could be a three wheel bootstrap machine having tie compressor, a cooling turbine and another turbine mounted to a common shaft. In yet another alternative, one of the air cycle machines could be a two or three wheel bootstrap machine and the other air cycle machine could be a two or three wheel bootstrap machine.

These considerations, and other considerations including the size of the air cycle machines 18 and 26, the sizes of the reheater 16 and the air-to-air heat exchanger 14, and the set points of the temperature control valves 20 and 32 are all dependent upon the application for which the ECS is intended. Therefore, the invention is not limited to the specific embodiments above. Instead, the invention is limited only by the claims that follow.

What is claimed is:

1. An environmental control system comprising:
   a first air cycle machine including a first cooling turbine;
   a second air cycle machine including a second cooling turbine, cooling turbine being cascaded with the first cooling turbine, the second cooling the first and second air cycle machines being on separate spools; and
   means for operating only the first air cycle machine during a first mode of operation, operating only the second air cycle machine during a second mode of operation, and operating both air cycle machines during a third mode of operation, the first and second cooling turbines being operated in cascade during the third mode of operation.

2. The system of claim 1, further comprising a mid-pressure water separator downstream the first cooling turbine and upstream the second cooling turbine.

3. The system of claim 2, wherein the operating means includes a valve for diverting air that has passed through the water separator to an outlet of the environmental control system during the first mode of operation, whereby the second air cycle machine can be bypassed by the valve during the first mode of operation.

4. The system of claim 2, wherein the operating means includes a valve for diverting air from an inlet of the first cooling turbine to an inlet of the second cooling turbine during the second mode of operation, whereby the first air cycle machine can be bypassed by the valve during the second mode of operation.

5. The system of claim 2, further comprising a single reheater for the first and second air cycle machines, the reheater having a hot side upstream the first cooling turbine and a cold side between an outlet of the water separator and an inlet of the second turbine.

6. The system of claim 5, further comprising a single air-to-air heat exchanger for the first and second air cycle machines, the air-to-air heat exchanger having a hot side upstream the hot side of the reheater.

7. The system of claim 1, further comprising valve means for allowing the first and second air cycle machines to be operated in parallel during a fourth mode of operation.

8. The system of claim 1, wherein the first and second air cycle machines are simple cycle machines.

9. The system of claim 1, wherein one of the air cycle machines is a simple cycle machine and the other air cycle machine is a bootstrap machine, whereby at least three different thermodynamic modes of operation are available.

10. The system of claim 5, wherein the operating means can bypass the first turbine by placing a hot side outlet of the reheater in fluid communication with an inlet of the water separator.

11. The system of claim 1, further comprising a controller for controlling the operating means.

12. The system of claim 1, wherein the first and second air cycle machines have different thermodynamic cycles.

13. The system of claim 1, wherein both air cycle machines are three wheel bootstrap machines.

14. The system of claim 1, wherein one of the air cycle machines is a three wheel bootstrap machine and the other of the air cycle machines is a two wheel bootstrap machine.

15. The system of claim 1, wherein one of the air cycle machines is a two wheel machine.

16. The system of claim 1, wherein one of the air cycle machines is a four-wheel bootstrap machine and the other of the air cycle machines is a simple cycle machine.

17. The system of claim 1, wherein one of the air cycle machines is a four-wheel bootstrap machine and the other of the air cycle machines is a two wheel bootstrap machine.

18. The system of claim 1, wherein one of the air cycle machines is a four-wheel bootstrap machine and the other of the air cycle machines is a three wheel bootstrap machine.

19. The system of claim 1, wherein one of the air cycle machines is a four-wheel bootstrap machine.

20. The system of claim 1, wherein the operating means selects the first mode of operation when the second air cycle machine fails, and wherein the operating means selects the second mode of operation when the first air cycle machine fails, whereby the system can always be operated after a single air cycle machine failure.

21. An environmental control system comprising:
   a first cooling turbine;
   a second cooling turbine downstream of the first cooling turbine; and
   a mid-pressure water separator downstream of the first cooling turbine and upstream of the second cooling turbine.

22. The system of claim 21, further comprising a single reheater having a hot side upstream the first cooling turbine and a cold side between an outlet of the water separator and an inlet of the second cooling turbine.

23. The system of claim 21, further comprising a first valve for diverting air from the water separator directly to an outlet of the environmental control system, whereby the second cooling turbine can be bypassed by the first valve; and a second valve for diverting air from an inlet of the first cooling turbine directly to the water separator, whereby the first cooling turbine can be bypassed by the second valve.

24. The system of claim 22, further comprising:
   a first controllable flow path between a hot side outlet of the reheater and an inlet of the water separator; and
   a second controllable flow path between an outlet of the water separator and an outlet of the environmental control system;
   whereby the first cooling turbine can be operated alone by closing the first controllable path and opening the second controllable path, the second cooling turbine can be operated alone by opening the first controllable path and closing the second controllable path, and the first and second turbines can be cascaded by closing the first and second controllable paths.

25. The system of claim 21, wherein the first cooling turbine is on a first spool and wherein the second cooling turbine is on a second spool.

26. The system of claim 21, further comprising means for allowing the first and second cooling turbines to be operated in parallel.

27. A method of operating an environmental control system including first and second air cycle machines, the first and second air cycle machines having first and second cooling turbines, respectively, the method comprising the steps of:
   supplying air to the first air cycle machine;
   expanding the supply air in the first cooling turbine;
   performing mid-pressure air/water separation on the air leaving the first air cycle machine, the separation being performed downstream the first cooling turbine but upstream the second cooling turbine; and
   expanding dehumidified air resulting from the mid-pressure separation in the second cooling turbine.

28. The method of claim 27, further comprising the step of reheating the dehumidified air prior to expansion in the second cooling turbine, whereby dry air containing substantially no condensed water prior is supplied to the second cooling turbine for further expansion and cooling.

29. The method of claim 27, further comprising the step of supplying the air expanded in the second cooling turbine to a compartment, wherein the dehumidified air is expanded by the second cooling turbine to a pressure that is substantially equal to a desired pressure of the compartment.

30. The method of claim 27, wherein pressure of air entering the first cooling turbine is greater than pressure of the air entering the second cooling turbine; wherein the pressure of the air entering the second cooling turbine is greater than pressure of the air leaving the second cooling turbine; and wherein the mid-pressure water separation is performed at a mid pressure between the pressure of the air entering the first cooling turbine and the pressure of the air entering the second cooling turbine, whereby condensed water is extracted from the air at the mid-pressure.

31. The method of claim 27, further comprising the steps of:
   bypassing the first air cycle machine when the first air cycle machine fails; and
   bypassing the second air cycle machine when the second air cycle machine fails.

* * * * *

UNITED STATES PATENT AND TRADEMARK OFFICE
CERTIFICATE OF CORRECTION

PATENT NO.    : 6,070,418
DATED         : June 6, 2000
INVENTOR(S)   : Ronald E. Crabtree et al.

Page 1 of 1

It is certified that error appears in the above-identified patent and that said Letters Patent is hereby corrected as shown below:

<u>Column 5,</u>
Lines 65 to 66, "cooling turbine being cascaded with the first cooling turbine, the second cooling"

Signed and Sealed this

Second Day of July, 2002

Attest:

Attesting Officer

JAMES E. ROGAN
*Director of the United States Patent and Trademark Office*